Patented Nov. 4, 1952

2,616,939

UNITED STATES PATENT OFFICE 2,616,939

SPONGE CADMIUM ELECTRODE AND METHOD OF MAKING THE SAME

Adolph Fischbach, Loch Arbour, N. J., assignor to the United States of America as represented by the Secretary of the Army No Drawing. Application May 2, 1951, Serial No. 224,245

7 Claims. (Cl. 136—90)

(Granted under the act of March 3, 1883, as amended April 30, 1928; 370 O. G. 757)

The invention described herein may be manufactured and used by or for the Government for governmental purposes, without the payment of any royalty thereon.

This invention relates to a sponge cadmium electrode for lightweight primary batteries and also for secondary batteries of limited rechargeability and methods of making such electrodes.

The invention is based on the discovery that thin, lightweight, sponge cadmium, plate electrodes of excellent electrical characteristics may be obtained by a process which comprises making a mixture of cadmium oxide and water, pasting said mixture into a supporting metal screen and forming the pasted cadmium oxide cathodically to metallic sponge cadmium.

One present day military requirement for certain batteries which are to function under all climatic conditions, is that they must be operable at $-65°$ F. This, of course, is not possible with normal dry cell batteries of the Leclanche type, nor even with the deferred action type batteries developed in recent years from which only ten to twenty percent of their $70°$ F. capacity can be obtained at $-40°$ F.

It is a general object of this invention to produce a lightweight sponge cadmium electrode which can be used as negative electrode in various electro-chemical systems using various electrolytes, providing in each case a battery of high capacity per unit of weight and volume, excellent operating characteristics at temperatures as low as $-70°$ F. and ability of being stored in the dry state at normal temperatures for indefinite periods of time.

The following description taken in connection with the appended claims represent specific embodiments of the broad inventive idea.

In preparing the sponge cadmium electrode according to the invention, cadmium oxide is mixed with water until a thick paste is obtained. For example, by mixing 70 gm. of cadmium oxide with about 10 gm. of water an easily handled thick paste is obtained which may be pasted by spatula into a grid consisting of a gauze, net or screen made of very thin metal wire such as copper, silver, nickel, aluminum or the like, as described in my copending application Serial Number 205,166, filed January 9, 1951, jointly with D. Linden. The screen wire may be as thin as 0.01 inch or less. The thickness of a screen is about double the thickness of the wire used to weave the screen; it is, however, possible to press the screen down almost to the thickness of a single wire. If, therefore, extremely thin grids are to be used, the screens are pressed after weaving. Various wire screens, e. g., 16/16 or 45/45 mesh, using various wire thicknesses up to 0.02 inch and more have been satisfactorily used. Finished pasted electrodes, with less than about 0.04 inch thickness and of extreme light weight, can thus be made showing sufficient mechanical strength and adequate electric characteristics.

If copper wire is used it is advantageous to electro-plate the wire with a protecting and impervious coating of lead, manganese or preferably cadmium which coatings prevent corrosion or dissolution of the screen metal by the electrolyte. If the battery is to be used as a "one-shot" battery (that is discarded after initial use) the copper wire does not have to be coated. However, where the battery is expected to have good charge retention after activation it is better to protect the grid material. The screen may or may not be pressed before the protective coating is put on.

After pasting the cadmium oxide into grids of the above described character the pasted plates are air or oven dried and then cathodically formed to sponge cadmium in a non acidic electrolyte. Preferably I use a potassium hydroxide solution of 1.280 and 1.300 sp. gm. and a current density ranging from about 1.0 to about 4.5 amperes per 1 square foot. After the cadmium oxide has been transformed into a metallic cadmium of spongy character, the electrode is washed very thoroughly, at least ½ hour in running water and then air or oven dried.

The spongy cadmium electrode made according to the invention may be used as negative electrode in various electro-chemical systems comprising two dissimilar electrodes and/or suitable acid or alkaline electrolyte such as for instance sulfuric acid and potassium hydroxide respectively. With a lead peroxide positive counter electrode in acid solution, the system becomes essentially a primary system. With a nickel oxide counter electrode in alkaline solution, the system may be rechargeable.

The particular advantages of the sponge cadmium electrode according to this invention are the excellent low temperature discharge characteristic and capability of being instantly activated at temperature as low as $-65°$ F. and lower. Known negative electrodes will not wet at these extreme low temperatures. Additional advantages are the high surface area of the spongy cadmium and therefore the high utilization of the active material under discharge.

The new sponge cadmium electrode is therefore particularly suitable for lightweight batteries which are to supply high current output for prolonged periods of time at very low temperature such as required for radiosonde transmitters and other special purpose application. Very good results have been achieved with deferred action type batteries comprising juxtaposed electrically connected cells, each cell comprising a sponge cadmium negative electrode made according to this invention, and a lead peroxide positive electrode separated by spacers of bibulous ionically conductive material such as paper, microsponge rubber, etc. This battery may be quickly activated even at extremely low temperatures by immersing it partially in the usual way into sulfuric acid or fluorboric acid electrolyte for about one to three minutes. After this time the battery is withdrawn from the electrolyte, shaken to remove excess liquid and is then immediately ready for use.

What is claimed is:

1. A method of making a lightweight sponge cadmium negative electrode for primary cells and cells of limited rechargeability comprising making a pasty mixture consisting of cadmium oxide and water, pasting said mixture into a supporting metal screen, drying said plate electrode and forming it cathodically to sponge cadmium in a non-acidic electrolyte and finally washing and drying said sponge cadmium plate electrode.

2. In a method of making a sponge cadmium electrode according to claim 1 in which said dried plate electrode is formed cathodically to sponge cadmium in a potassium hydroxide solution.

3. In a method of making a sponge cadmium electrode according to claim 1 in which said pasty mixture of cadmium oxide and water is pasted into a metal screen made from wire of less than about 0.03" thickness.

4. In a method of making a sponge cadmium electrode according to claim 1 in which said pasty mixture of cadmium oxide and water is pasted into a metal screen made from wire of less than about 0.03" thickness, said wire screen having been pressed down to about the initial thickness of the single wire.

5. In a method of making a sponge cadmium electrode according to claim 1 in which said metal screen is made from copper wire coated with metallic cadmium.

6. In a deferred action type battery of limited rechargeability comprising juxtaposed electrically connected cells, said cells each comprising a sponge cadmium negative electrode and a lead peroxide positive electrode separated by spacers of bibulous ionically conductive material, the sponge cadmium of said negative electrode having been obtained by pasting a mixture consisting of cadmium oxide and water into a supporting metal screen made from wire of less than about 0.03" thickness, drying said pasted metal screen and forming it cathodically to sponge cadmium.

7. In a deferred action type battery according to claim 6 in which said metal screen is made from copper wire coated with metallic cadmium

ADOLPH FISCHBACH.

REFERENCES CITED

The following references are of record in the file of this patent:

UNITED STATES PATENTS

| Number | Name | Date |
|---|---|---|
| 670,024 | Jungner | Mar. 19, 1901 |
| 945,243 | Morrison | Jan. 4, 1910 |
| 1,078,380 | Reynolds | Nov. 11, 1913 |
| 2,448,052 | Roberts | Aug. 31, 1948 |

FOREIGN PATENTS

| Number | Country | Date |
|---|---|---|
| 5,545 | Great Britain | of 1912 |
| 817,785 | France | May 31, 1937 |